US012690105B2

(12) United States Patent
Su

(10) Patent No.: US 12,690,105 B2
(45) Date of Patent: Jul. 21, 2026

(54) LED DISPLAY AND PULSE WIDTH MODULATION SYSTEM THEREFOR

(71) Applicant: XIAMEN XM-PLUS TECHNOLOGY CO., LTD, Xiamen (CN)

(72) Inventor: Wei-Chun Su, Hsinchu (CN)

(73) Assignee: XIAMEN XM-PLUS TECHNOLOGY CO., LTD, Xiamen (CN)

( * ) Notice: Subject to any disclaimer, the term of this patent is extended or adjusted under 35 U.S.C. 154(b) by 36 days.

(21) Appl. No.: 18/849,556

(22) PCT Filed: Dec. 7, 2022

(86) PCT No.: PCT/CN2022/137223
§ 371 (c)(1),
(2) Date: Sep. 23, 2024

(87) PCT Pub. No.: WO2023/179093
PCT Pub. Date: Sep. 28, 2023

(65) Prior Publication Data

US 2025/0203727 A1 Jun. 19, 2025

(30) Foreign Application Priority Data

Mar. 23, 2022 (CN) ......................... 202210289807.6

(51) Int. Cl.
*H05B 45/325* (2020.01)

(52) U.S. Cl.
CPC ................................ *H05B 45/325* (2020.01)

(58) Field of Classification Search
CPC .................................................. H05B 45/325
See application file for complete search history.

(56) References Cited

U.S. PATENT DOCUMENTS 8,525,609 B1 * 9/2013 Sadasivam ............... H03K 7/08 327/172
10,380,934 B2 * 8/2019 Kim ..................... G09G 3/3225
(Continued)

FOREIGN PATENT DOCUMENTS

CN 102394643 A 3/2012
CN 102458021 A 5/2012
(Continued)

OTHER PUBLICATIONS

International Search Report for PCT/CN2022/137223 mailed Feb. 28, 2023, ISA/CN.
(Continued)

*Primary Examiner* — Adam D Houston
(74) *Attorney, Agent, or Firm* — Yue (Robert) Xu; Apex Attorneys at Law, LLP

(57) ABSTRACT

A pulse width modulation system. Considering that a phase-locked loop can reduce a pulse width of a clock signal by increasing the frequency, in the present application, by means of a control voltage outputted by a filter in the phase-locked loop, an external second voltage-controlled retarder which has the same structure as a voltage-controlled retarder in the phase-locked loop can shift a phase of an original PWM signal backwards by a preset delay duration (less than one clock signal period) to obtain a signal to be superimposed. In this way, a target PWM signal of which the pulse width is the sum of the pulse width of the original PWM signal and the preset delay duration can be generated by superposing the signal to be superposed and the original PWM signal.

14 Claims, 3 Drawing Sheets

(56) References Cited

U.S. PATENT DOCUMENTS

| | | | | |
|---|---|---|---|---|
| 10,495,924 | B2 * | 12/2019 | Notoshi | G02F 1/133603 |
| 11,039,517 | B2 * | 6/2021 | Li | H05B 45/325 |
| 11,290,089 | B2 * | 3/2022 | Akondy | H03K 5/04 |
| 11,490,481 | B2 * | 11/2022 | Chang | H05B 45/325 |
| 11,538,427 | B1 * | 12/2022 | L'Episcopo | G09G 3/3413 |
| 11,645,973 | B1 * | 5/2023 | Li | H05B 45/325 345/212 |
| 12,504,779 | B2 * | 12/2025 | Chae | G06F 1/12 |
| 2007/0285140 | A1 | 12/2007 | Kubo | |
| 2008/0238337 | A1 * | 10/2008 | Masood | H05B 45/37 315/294 |
| 2012/0098869 | A1 | 4/2012 | Tseng | |
| 2013/0177331 | A1 * | 7/2013 | Iwasaki | G03G 15/5004 700/286 |
| 2015/0163870 | A1 | 6/2015 | Fan | |
| 2015/0279267 | A1 * | 10/2015 | Tien | H05B 45/325 345/82 |
| 2018/0367218 | A1 * | 12/2018 | Gyoten | H04B 10/5161 |
| 2019/0261472 | A1 | 8/2019 | Liming | |
| 2021/0018795 | A1 * | 1/2021 | Calayir | H05B 45/10 |
| 2021/0112641 | A1 * | 4/2021 | Li | H05B 45/325 |
| 2022/0059023 | A1 | 2/2022 | Huang | |
| 2024/0087500 | A1 * | 3/2024 | Luo | G09G 3/2088 |
| 2025/0203727 | A1 * | 6/2025 | Su | H05B 45/325 |
| 2025/0324497 | A1 * | 10/2025 | Hussell | H05B 45/325 |

FOREIGN PATENT DOCUMENTS

| | | | | |
|---|---|---|---|---|
| CN | 102629863 | A | 8/2012 | |
| CN | 202364200 | U | 8/2012 | |
| CN | 106209038 | A | 12/2016 | |
| CN | 106301301 | A | 1/2017 | |
| CN | 106712490 | A | 5/2017 | |
| CN | 108668399 | A | 10/2018 | |
| CN | 111028768 | A | 4/2020 | |
| CN | 111724728 | A | 9/2020 | |
| CN | 112187229 | A | 1/2021 | |
| CN | 112510975 | A | 3/2021 | |
| CN | 113140181 | A | 7/2021 | |
| CN | 114724501 | A | 7/2022 | |
| DE | 19732142 | A1 | 6/1998 | |
| EP | 4156864 | A1 * | 3/2023 | H05B 45/46 |
| JP | H10173498 | A | 6/1998 | |
| JP | 2000168147 | A | 6/2000 | |
| JP | 2000285613 | A | 10/2000 | |
| JP | 2012129841 | A | 7/2012 | |
| TW | 202046275 | A | 12/2020 | |
| WO | WO-2021008732 | A1 * | 1/2021 | G07D 7/121 |

OTHER PUBLICATIONS

CNIPA First Office Action corresponding to Application No. 202210289807.6; Issued date of Sep. 23, 2023.

* cited by examiner

LED DISPLAY AND PULSE WIDTH MODULATION SYSTEM THEREFOR

The present application is the national phase of International Application No. PCT/CN2022/137223, titled "LED DISPLAY AND SYSTEM FOR PULSE WIDTH MODULATION THEREFOR", filed on Dec. 7, 2022, which claims priority to Chinese Patent Application No. 202210289807.6, titled "LED DISPLAY AND SYSTEM FOR PULSE WIDTH MODULATION THEREFOR", filed on Mar. 23, 2022, with the China National Intellectual Property Administration, which is incorporated herein by reference in its entirety.

FIELD

The present disclosure relates to the technical field of pulse width modulation, and in particular to a system for pulse width modulation. The present disclosure relates further to an LED display.

BACKGROUND

Generally, duration of a high level in each period of a driving current of a light-emitting diode (LED) depends on a pulse width modulation (PWM) signal. A pulse width of the PWM signal is usually a positive integer multiple of a minimum operating period of a digital circuit that generates the PWM signal. Thus, the duration of the high level in each period of the driving current of the LED can only be adjusted among positive integer multiples of such "minimum operating period". The large step size of the adjustment reduces fineness of the LED display.

At present, the above issue needs to be addressed by those skilled in the art.

SUMMARY

An objective of embodiments of the present disclosure is providing a system for pulse width modulation. Thereby, duration of a high-level in each period of a driving current of a light-emitting diode (LED) can be adjusted with small step size, and hence fineness of the LED display can be improved. Another objective of embodiments of the present disclosure is to provide an LED display comprising the foregoing system. Thereby, duration of the high-level in each period of the driving current of the LED can be adjusted with small step size, and hence fineness of the LED display can be improved.

A system for system for pulse width modulation is provided according to embodiments of the present disclosure, which addresses the above technical issue. The system comprises: clock-signal generating circuitry, configured to generate a clock signal; pulse generating circuitry, configured to generate an original pulse width modulation (PWM) signal, of which a pulse width is a preset integer multiple of a period of the clock signal; a phase-locked loop, configured to generate a control voltage according to the clock signal; a second voltage-controlled delayer, identical to a first voltage-controlled delayer in the phase-locked loop in structure, where the second voltage-controlled delayer is configured to delay, under excitation of the control voltage that is outputted by a filter in the phase-locked loop, the original PWM signal in phase by preset delay duration to obtain a to-be-superimposed signal; and a logic controller, configured to superimpose the to-be-superimposed signal with the original PWM signal to generate a target PWM signal, where a pulse width of the target PWM signal is a sum of the pulse width of the original PWM signal and the preset delay duration; where the preset delay duration is equal to an integer multiple of 1/N, which ranges from 1/N to N/N, of the period of the clock signal, and Nis a preset positive integer.

In a preferable embodiment, the second voltage-controlled delayer and the logic controller are both components of a PWM circuit, where the system comprises multiple PWM circuits, each of which is identical to the PWM circuit, and the multiple PWM circuits are in one-to-one correspondence to respective current driving circuits of light emitting diodes (LEDs).

In a preferable embodiment, the phase-locked loop is a delay-locked loop (DLL).

In a preferable embodiment, the preset positive integer is 5.

In a preferable embodiment, the clock-signal generating circuitry is a clock generator.

In a preferable embodiment, the system further comprises a memory configured to store the clock signal and the preset delay duration, where the pulse generating circuitry is configured to generate the original PWM signal according to the stored clock signal and transmit the stored preset delay duration to the second voltage-controlled delayer.

In a preferable embodiment, the memory is a random-access memory (RAM).

An LED display is further provided according to embodiments of the present disclosure, which addresses the above technical issue. The LED display comprises the foregoing system for pulse width modulation.

Herein the system for pulse width modulation is provided. The phase-locked loop can increase a frequency and thus reduce a pulse width of a clock signal. Accordingly, the control voltage outputted by the filter in the phase-locked loop is fed into the external second voltage-controlled delayer having the same structure as the voltage-controlled delayer in the phase-locked loop, such that the original PWM signal can be delayed in phase by the preset delay duration (which is shorter than one period of the clock signal) to obtain the to-be-superimposed signal. Thereby, the to-be-superimposed signal and the original PWM signal can be superimposed to generate the target PWM signal, of which the pulse width is the sum of that of the original PWM signal and the preset delay duration. Therefore, the duration of the high level in each period of the driving current of the LEDs can be adjusted with a smaller step size, which improves fineness of the LED display.

The LED display provided herein has the same beneficial effects as the foregoing system for pulse width modulation.

BRIEF DESCRIPTION OF THE DRAWINGS

Hereinafter drawings to be applied in embodiments of the present disclosure are briefly described, in order to clarify illustration of technical solutions according to embodiments of the present disclosure. Apparently, the drawings in the following descriptions are only some embodiments of the present disclosure, and other drawings may be obtained by those skilled in the art based on the provided drawings without exerting creative efforts

DETAILED DESCRIPTION OF EMBODIMENTS

A core of embodiments of the present disclosure is providing a system for pulse width modulation, which enables a small step size in adjustment of duration of a high level in each period of a driving current of a light emitting diode (LED) and helps improve fineness of the LED display. Another core of embodiments of the present disclosure providing an LED display comprising the foregoing system for pulse width modulation, which enables a small step size in adjustment of duration of a high level in each period of a driving current of an LED and helps improve fineness of the LED display.

Hereinafter technical solutions in embodiments of the present disclosure are described clearly and completely in conjunction with the drawings in embodiments of the present closure to clarify objections, technical schemes, and advantages of the embodiments. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
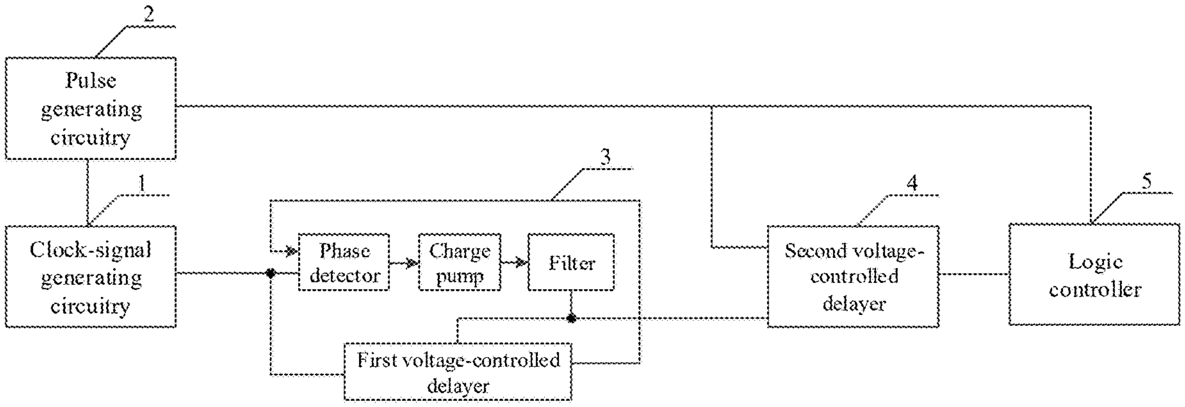
FIG. 1 is a schematic structural diagram of a system for pulse width modulation according to an embodiment of the present disclosure.

Reference is made to FIG. 1, which is a schematic structural diagram of a system for pulse width modulation according to an embodiment of the present disclosure. The system comprises clock-signal generating circuitry 1, pulse generating circuitry 2, phase-locked loop 3, a second voltage-controlled delayer 4, and a logic controller 5.

The clock-signal generating circuitry 1 is configured to generate a clock signal.

The pulse generating circuitry 2 is configured to generate an original PWM signal, of which a pulse width is a preset integer multiple of a period of the clock signal.

The phase-locked loop 3 is configured to generate a control voltage according to the clock signal.

The second voltage-controlled delayer 4 is identical to a first voltage-controlled delayer, which is in the phase-locked loop 3, in structure. The second voltage-controlled delayer 4 is configured to delay the original PWM signal in phase by preset delay duration, under excitation of the control voltage outputted by a filter in the phase-locked loop 3, to obtain a to-be-superimposed signal.

The logic controller 5 is configured to superimpose the to-be-superimposed signal and the original PWM signal to generate a target PWM signal, of which a pulse width is equal to a sum of the pulse width of the original PWM signal and the preset delay duration.

The preset delay duration is equal to an integer multiple of 1/N, which ranges from 1/N to N/N, of the period of the clock signal, and Nis a preset positive integer As regards the technical issue described in the background, the phase-locked loop 3 (which serves as a frequency multiplier) can multiple a reference clock frequency of the clock signal, and thereby reduce a pulse width of the clock signal. In a case that the frequency-multiplied signal outputted by the phase-locked loop 3 is directly utilized, a downstream digital circuit may be forced to have a high frequency for signal processing, which increases a volume and a cost of such digital circuit. Herein the frequency multiplied signal outputted by the phase-locked loop 3 is not directly applied. Instead, the second voltage-controlled delayer 4 having the same structure as the first voltage-controlled delayer in the phase-locked loop 3 is additionally provided, and the control voltage outputted by the filter in the phase-locked loop 3 serves as an excitation signal. Thereby, the second voltage-controlled delayer 4 can delay the original PWM signal in phase by the preset delay duration and thus obtain the to-be-superimposed signal. The preset delay duration can be designated through selecting a signal. Since the second voltage-controlled delayer 4 has the same structure as the first voltage-controlled delayer, the preset delay duration may be set to be an integer multiple of 1/N, which ranges from 1/N to N/N, of the period of the clock signal. N is a quantity of partitions, into which the reference clock frequency may be equally divided by the first voltage-controlled delayer in the frequency multiplier.

After the preset delay duration is set, the logic controller 5 superimposes the to-be-superimposed signal with the original PWM signal to generate the target PWM signal, of which the pulse width is equal to the sum of the pulse width of the original PWM signal and the preset delay duration. In other words, the pulse width of the PWM signal that is inputted into a current driving circuit can be adjusted with a smaller step size, so that a brightness difference among various LEDs can reach a lower scale. Thereby, fineness and performances of displays can be improved.

Herein the preset integer multiple may also be configured independently, which is not limited herein.

Figure 2:
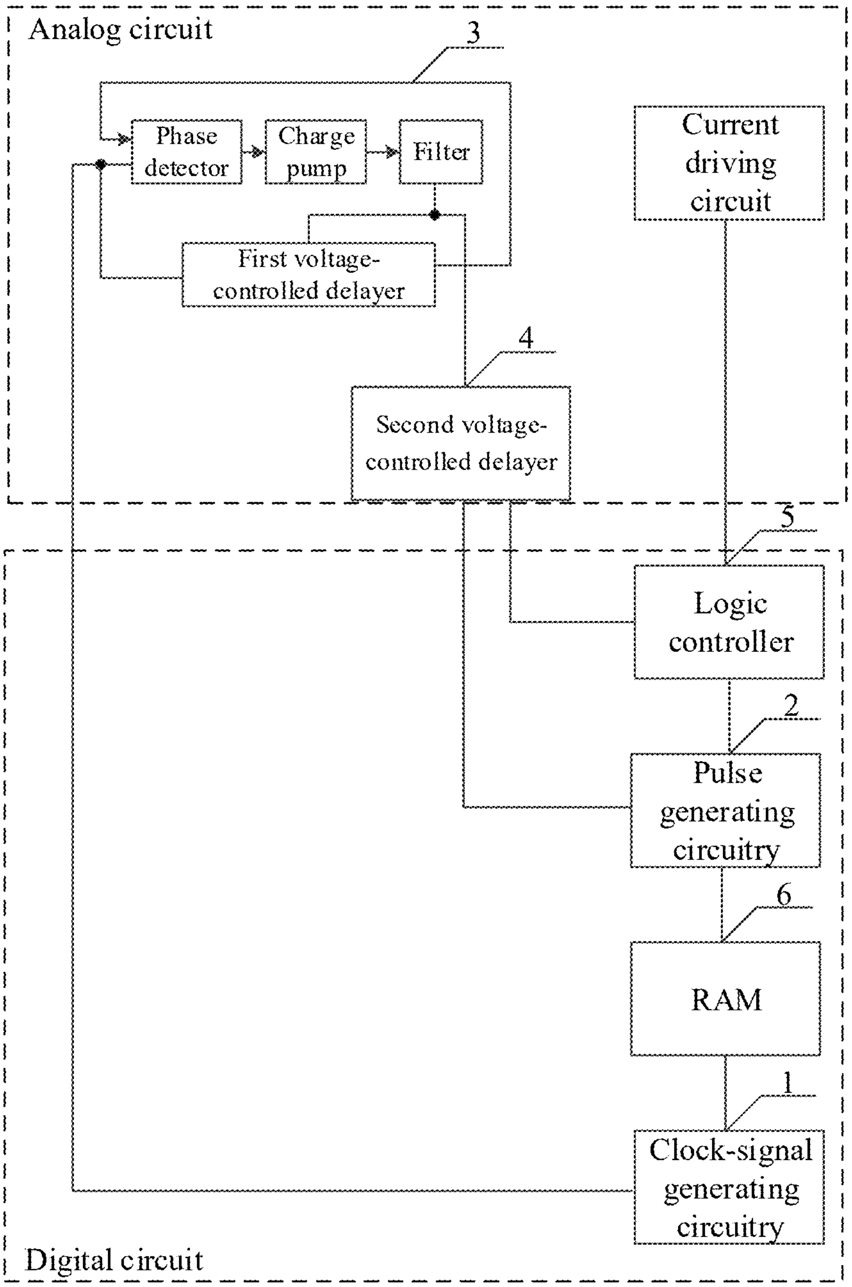
FIG. 2 is a schematic structural diagram of a system for pulse width modulation according to another embodiment of the present disclosure.
Figure 3:
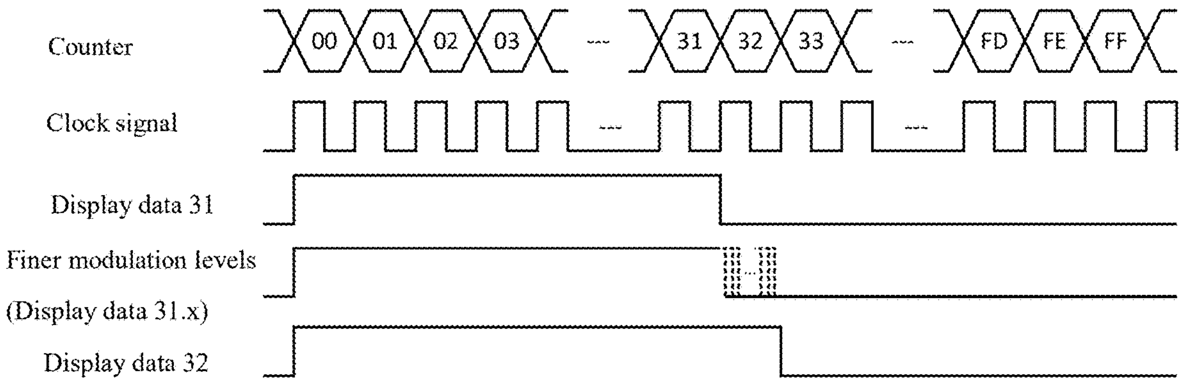
FIG. 3 is a schematic diagram of an effect of a system for pulse width modulation according to an embodiment of the present disclosure.

Reference is made to FIG. 2 and FIG. 3 for better illustration of embodiments of the present disclosure. FIG. 2 is a schematic structural diagram of a system for pulse width modulation according to another embodiment of the present disclosure. FIG. 3 is a schematic diagram of an effect of a system for pulse width modulation according to an embodiment of the present disclosure.

In an embodiment, brightness of an LED is determined by a product of output current ($I_{OUT}$) and duration of a channel being on ($T_{PWM}$). Generally, the output current is configured to be constant, and thus the brightness of the display is directly determined by the duration of the channel being on (i.e., by a modulated pulse width of the channel). A finer presentation of a display screen requires that a minimum step size ($\Delta t_{PWM\_STEP}$) of the modulation is smaller or subject to a higher modulation frequency.

For example, an operating frequency of a digital circuit is 50 MHz, and hence one period is 20 ns. In such case, the step size of the pulse width of a display panel is 20 ns in conventional control manners. In comparison, when using the technical schemes provided herein in PWM, coordination between the second voltage-controlled delayer 4 and the logic controller 5 can achieve a step size of the outputted pulse width smaller than 20 ns. That is, as shown in FIG. 3, more levels of display data, such as 31.1, 31.2, and the like, may be added between the original levels 31 and 32 of display data. The present disclosure is not limited to the above example.

Herein the system for pulse width modulation is provided. The phase-locked loop can increase a frequency and thus reduce a pulse width of a clock signal. Accordingly, the control voltage outputted by the filter in the phase-locked loop is fed into the external second voltage-controlled delayer having the same structure as the voltage-controlled delayer in the phase-locked loop, such that the original PWM signal can be delayed in phase by the preset delay duration (which is shorter than one period of the clock signal) to obtain the to-be-superimposed signal. Thereby, the to-be-superimposed signal and the original PWM signal can be superimposed to generate the target PWM signal, of which the pulse width is the sum of that of the original PWM signal and the preset delay duration. Therefore, the duration of the high level in each period of the driving current of the LEDs can be adjusted with a smaller step size, which improves fineness of the LED display.

Following embodiments are provided on a basis of the foregoing embodiments.

In a preferable embodiment, the second voltage-controlled delayer 4 and the logic controller 5 both are components of a pulse width modulation circuit.

There are multiple pulse width modulation circuits, and the PWM circuits are in one-to-one correspondence to respective current driving circuits of different light LEDs.

In an embodiment, there are a large number of LEDs in a display. In order to lower a cost, there are multiple PWM circuits, each of which comprises the second voltage-controlled delayer 4 and the logic controller 5. As regarding other components, each of the clock-signal generating circuitry 1, the pulse generating circuitry 2, and the phase-locked loop 3 may comprise only one circuit. That is, the multiple PWM circuits are connected in parallel at an output terminal of the filter in the phase-locked loop 3, and the control voltage outputted by the filter serves as excitation for each of the second voltage-controlled delayers 4. Thereby, the cost is low, and a circuit volume is small.

It is appreciated that the system for pulse width modulation may alternatively have another configuration, which is not limited herein.

In a preferrable embodiment, the phase-locked loop 3 is a delay-locked loop (DLL).

The DLL is advantageous in a small dimension, a low cost, and a long service life.

It is appreciated that the phase-locked loop 3 may be of a type other than the DLL, for example, may be an all-digital DLL or an analog phase-locked loop, which is not limited herein.

In a preferable embodiment, the preset positive integer is 5.

The preset positive integer being 5 can not only achieve a low preset delay duration for dela but also lower a cost of the second voltage-controlled delayer 4.

It is appreciated that the preset positive integer may configured to have another value, which is not limited herein.

In a preferable embodiment, the clock-signal generating circuitry 1 is a clock generator.

The clock generator is advantageous in a small size, a low cost, strong stability, and the like.

In a preferable embodiment, the system for pulse width modulation further comprises a memory.

The memory 6 is configured to store the clock signal and the preset delay duration.

The pulse generating circuitry 2 is specifically configured to generate the original PWM signal, of which the pulse width is the preset integer multiple of the period of the clock signal, according to the stored clock signal, and transmit the stored preset delay duration to the second voltage-controlled delayer 4.

The above processing on the stored clock signal can improve signal stability, and the above processing on the preset delay duration permits that the preset delay duration is transmitted only once.

In a preferable embodiment, the memory 6 is a random-access memory (RAM).

The RAM are advantageous in a small size, a low cost, and a long service life.

It is appreciated that the memory 6 may be of another type, which is not limited herein.

An LED display is further provided according to embodiments of the present disclosure. The LED display comprises any foregoing system for pulse width modulation.

Description of the LED display may refer to the foregoing embodiments of the system for pulse width modulation, and the details are not repeated herein.

The embodiments of the present disclosure are described in a progressive manner, and each embodiment places emphasis on the difference from other embodiments. Therefore, one embodiment can refer to other embodiments for the same or similar parts. It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but conforms to a widest scope in accordance with principles and novel features disclosed in the present disclosure.

The invention claimed is:

1. A system for system for pulse width modulation, comprising:

clock-signal generating circuitry, configured to generate a clock signal;

pulse generating circuitry, configured to generate an original pulse width modulation (PWM) signal, of which a pulse width is a preset integer multiple of a period of the clock signal;

phase-locked circuitry, configured to generate a control voltage according to the clock signal;

a second voltage-controlled delayer, identical to a first voltage-controlled delayer in the phase-locked circuitry in structure, wherein the second voltage-controlled delayer is configured to delay, under excitation of the control voltage that is outputted by a filter in the phase-locked circuitry, the original PWM signal in phase by preset delay duration to obtain a to-be-superimposed signal; and a logic controller, configured to superimpose the to-be-superimposed signal with the original PWM signal to generate a target PWM signal, wherein a pulse width of the target PWM signal is a sum of the pulse width of the original PWM signal and the preset delay duration;

wherein the preset delay duration is equal to an integer multiple of 1/N, which ranges from 1/N to N/N, of the period of the clock signal, and N is a preset positive integer.

2. The system according to claim 1, wherein:

the second voltage-controlled delayer and the logic controller are both components of a PWM circuit, the system comprises a plurality of PWM circuits, each PWM circuit of the plurality of PWM circuits is identical to the PWM circuit, and PWM circuits of the plurality of PWM circuits are in one-to-one correspondence to respective current driving circuits of light emitting diodes (LEDs).

3. The system according to claim 1, wherein the phase-locked circuitry is a delay-locked loop (DLL).

4. The system according to claim 1, wherein the preset positive integer is 5.

5. The system according to claim 1, wherein the clock-signal generating circuitry is a clock generator.

6. The system according to claim 1, further comprising:

a memory configured to store the clock signal and the preset delay duration;

wherein the pulse generating circuitry is configured to generate the original PWM signal according to the stored clock signal and transmit the stored preset delay duration to the second voltage-controlled delayer.

7. The system according to claim 6, wherein the memory is a random-access memory (RAM).

8. A light emitting diode (LED) display, comprising a system for pulse width modulation, wherein the system comprises:

clock-signal generating circuitry, configured to generate a clock signal;

pulse generating circuitry, configured to generate an original pulse width modulation (PWM) signal, of which a pulse width is a preset integer multiple of a period of the clock signal;

phase-locked circuitry, configured to generate a control voltage according to the clock signal;

a second voltage-controlled delayer, identical to a first voltage-controlled delayer in the phase-locked circuitry in structure, wherein the second voltage-controlled delayer is configured to delay, under excitation of the control voltage that is outputted by a filter in the phase-locked circuitry, the original PWM signal in phase by preset delay duration to obtain a to-be-superimposed signal; and a logic controller, configured to superimpose the to-be-superimposed signal with the original PWM signal to generate a target PWM signal, wherein a pulse width of the target PWM signal is a sum of the pulse width of the original PWM signal and the preset delay duration;

wherein the preset delay duration is equal to an integer multiple of 1/N, which ranges from 1/N to N/N, of the period of the clock signal, and N is a preset positive integer.

9. The LED display according to claim 8, wherein:

the second voltage-controlled delayer and the logic controller are both components of a PWM circuit, the system comprises a plurality of PWM circuits, and each PWM circuit of the plurality of PWM circuits is identical to the PWM circuit, and PWM circuits of the plurality of PWM circuits are in one-to-one correspondence to respective current driving circuits of light emitting diodes (LEDs).

10. The LED display according to claim 8, wherein the phase-locked circuitry is a delay-locked loop (DLL).

11. The LED display according to claim 8, wherein the preset positive integer is 5.

12. The LED display according to claim 8, wherein the clock-signal generating circuitry is a clock generator.

13. The LED display according to claim 8, further comprising:

a memory configured to store the clock signal and the preset delay duration;

wherein the pulse generating circuitry is configured to generate the original PWM signal according to the stored clock signal and transmit the stored preset delay duration to the second voltage-controlled delayer.

14. The LED display according to claim 13, wherein the memory is a random-access memory (RAM).

* * * * *